United States Patent
Conca et al.

(10) Patent No.: US 6,522,950 B1
(45) Date of Patent: Feb. 18, 2003

(54) METHOD FOR OFF-LINE PROGRAMMING AN INDUSTRIAL ROBOT

(75) Inventors: Paolo Conca, Gallarate (IT); Leonardo Leani, Milan (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 10/070,158

(22) PCT Filed: Aug. 4, 2000

(86) PCT No.: PCT/EP00/07893

§ 371 (c)(1),
(2), (4) Date: Mar. 4, 2002

(87) PCT Pub. No.: WO01/17729

PCT Pub. Date: Mar. 15, 2001

(30) Foreign Application Priority Data

Sep. 6, 1999 (IT) .......................................... MI99A1877

(51) Int. Cl.[7] .............................................. G06F 19/00
(52) U.S. Cl. ...................... 700/245; 700/246; 700/250; 700/253; 700/254; 700/257; 700/262; 711/103; 711/133; 711/154; 711/156; 711/159; 365/189.08; 365/189.03; 365/230.03
(58) Field of Search ................................. 700/245, 246, 700/250, 253, 254, 257, 262; 711/103, 133, 137, 156, 154, 159, 213, 204; 706/23, 15, 16, 26, 27; 365/189.08, 189.03, 230.03

(56) References Cited

U.S. PATENT DOCUMENTS

| | | | |
|---|---|---|---|
| 4,831,548 A | | 5/1989 | Matoba et al. |
| 5,046,022 A | | 9/1991 | Conway et al. |
| 5,287,472 A | * | 2/1994 | Horst .......................... 700/187 |
| 5,495,410 A | | 2/1996 | Graf |
| 5,787,484 A | * | 7/1998 | Norman ................... 56/10.2 H |
| 6,438,665 B2 | * | 8/2002 | Norman ....................... 701/50 |
| 2002/0004878 A1 | * | 1/2002 | Norman ...................... 700/255 |

FOREIGN PATENT DOCUMENTS

| | | |
|---|---|---|
| EP | A-0 807 497 | 11/1997 |
| EP | A-0 902 343 | 3/1999 |

OTHER PUBLICATIONS

Kamper, New ways of user–oriented robot programming, 1998, IEEE, pp. 1936–1940.*
Ribeiro et al., A low cost cell calibration technique adn its PC based control software, 1997, IEEE, pp. 840–845.*
Boopathy et al., An approach to robot off–line programming and simulation for flexible manufacturing systems, 1995, IEEE, pp. 461–466.*
Nielsen et al., Robot off–line programming and simulation as a true CIME–Subsystem, 1992, IEEE, pp. 1089–1094.*

* cited by examiner

*Primary Examiner*—William A. Cuchlinski, Jr.
*Assistant Examiner*—McDieunel Marc
(74) *Attorney, Agent, or Firm*—Guido Modiano; Albert Josif; Daniel O'Byrne

(57) ABSTRACT

A method for performing the off-line programming of the movement of an industrial robot, which is dedicated to an industrial apparatus for processing. The method allows performing the off-line programming of the movement of a robot by using sequences of instructions, which adopt a relatively high level of abstraction. Therefore, it is possible to increased the operating flexibility of the robot and, at the same, to reduce programming times and costs.

15 Claims, 2 Drawing Sheets

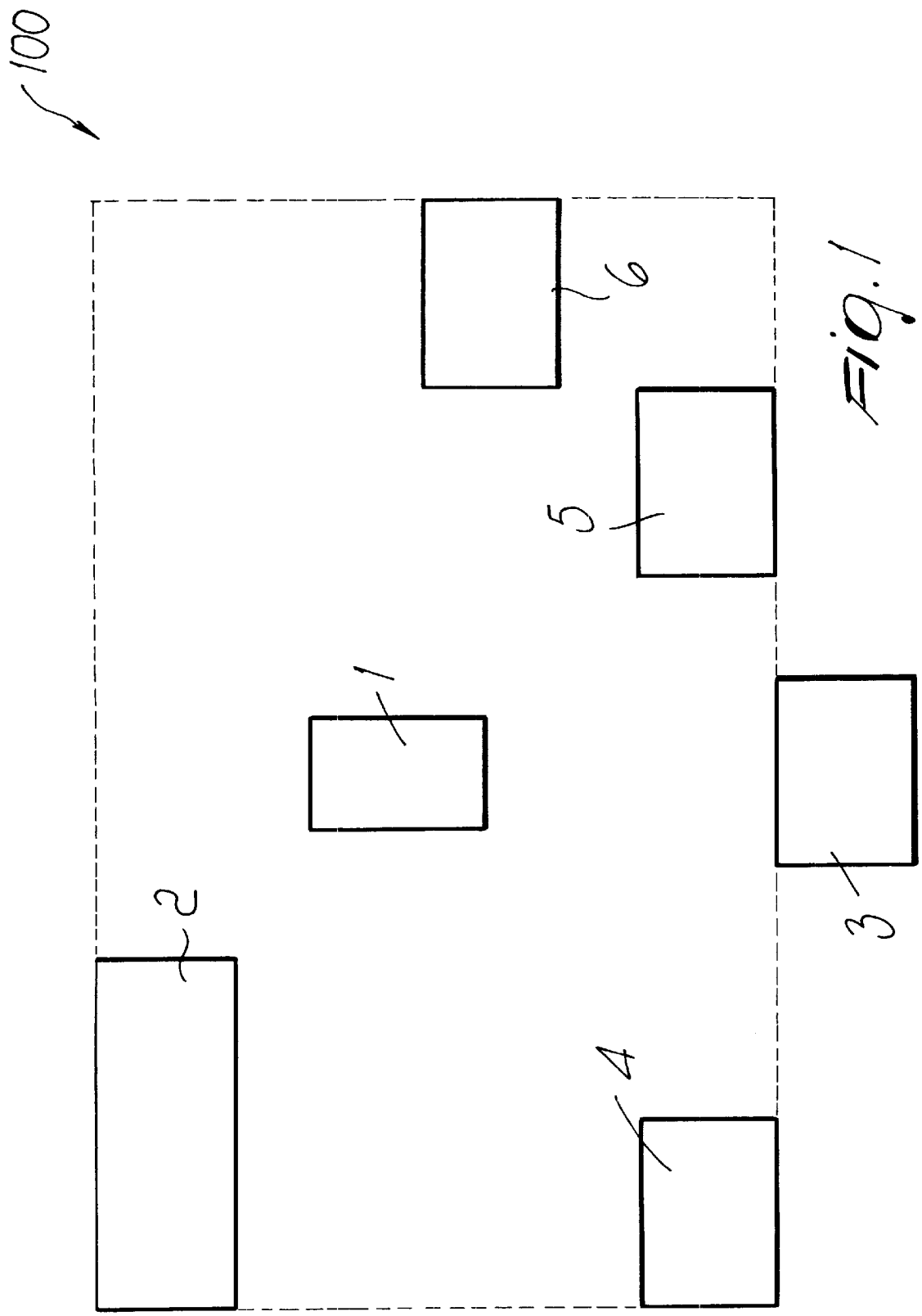

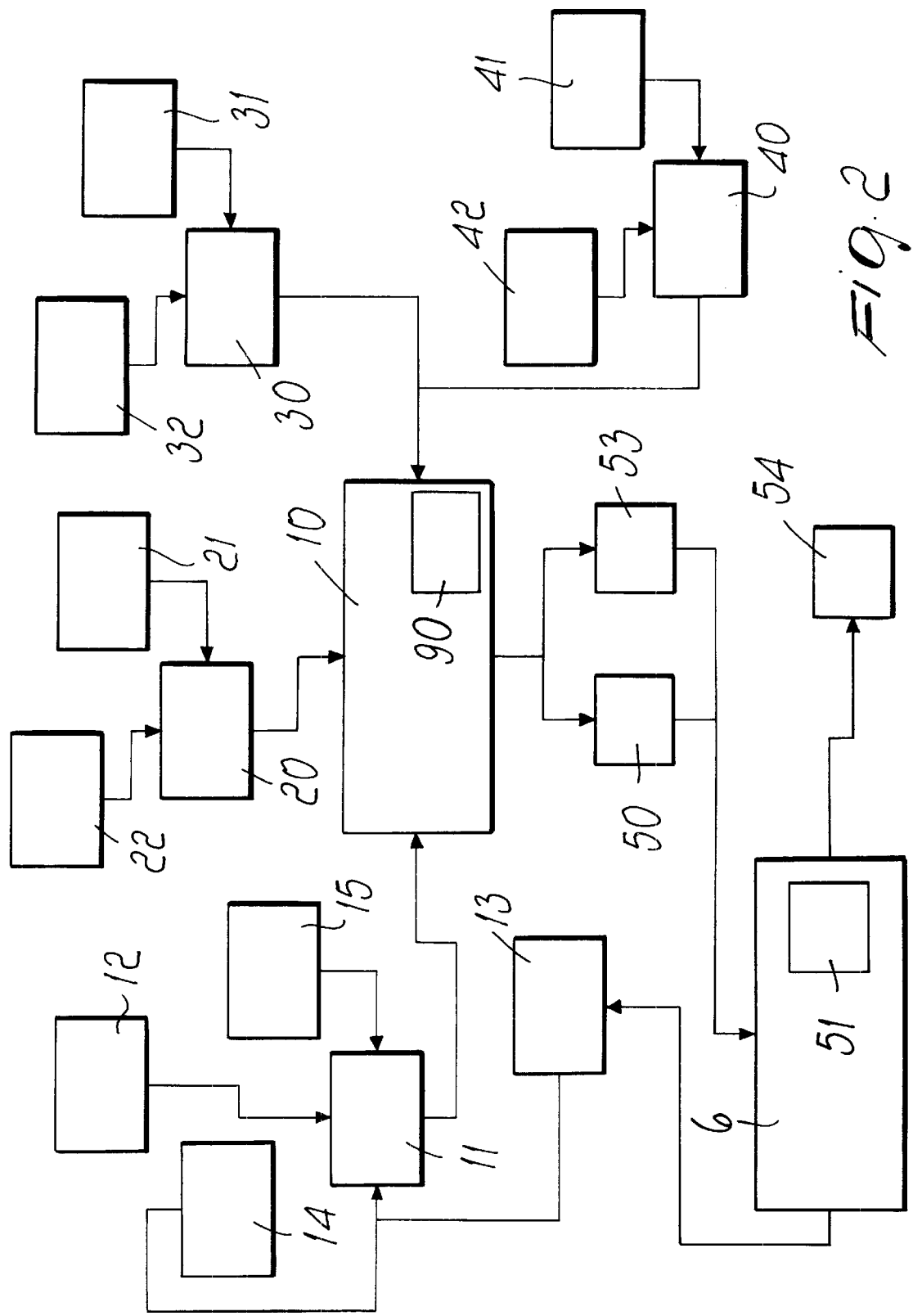

METHOD FOR OFF-LINE PROGRAMMING AN INDUSTRIAL ROBOT

BACKGROUND OF THE INVENTION

The present invention relates to a method for programming off-line an industrial robot.

More particularly, the present invention relates to a method, which allows performing the off-line programming of the movement of a robot, which is dedicated to an industrial apparatus for processing products.

Several methods for programming the movement of industrial robots are known in the state of the art. The term "programming" designates the act of performing a set of operations required to generate sequences of low-level instructions executable by the actuation and control unit of the industrial robot. These sequences of low-level instructions are suitable for controlling the movement of the robot in an empty space, inside the manufacturing cell, in which the robot is placed. The type of movement selected depends ultimately on the type of apparatus to which the industrial robot is dedicated.

The most widely used methods provide for direct programming of the actuation and control unit by using devices dedicated to facilitating selflearning in the field. In practice, sequences of low-level executable instructions, implemented in one of the known languages, such as for example the RAPID® language, are stored directly in the actuation and control unit. Although these methods achieve their intended goals, they have some drawbacks.

A relatively long downtime of the robot is in fact necessary during its programming. This fact entails a considerable increase in operation costs, with a consequent reduction in the fields of application in which it can be used advantageously.

Furthermore, programming occurs substantially manually: the data, albeit relatively rapidly by virtue of the use of the described dedicated devices, must be entered one by one. The lack of automatic systems in data entry entails a considerable increase in the possibilities of error. The possibility to download these data from predefined information-technology media is furthermore limited. In order to obviate these drawbacks, methods have become widespread which provide for off-line programming of the movement of the robot. Instead of being directly stored in the actuation and control unit, the sequences of executable instructions are generated in an information-technology medium, which is separate from the actuation and control unit. The sequences of executable instructions are then downloaded to the actuation and control unit, considerably reducing machine downtime.

Even these known methods of the current art, however, have some drawbacks.

First of all, since sequences of low-level instructions are generally still used, programming is in any case complex and onerous: in particular, the code is difficult to read and correct. This requires the presence of highly specialized personnel. Furthermore, again due to the use of a language which is characterized by a low level of abstraction, it is necessary to program the robot whenever there is a change in the industrial process performed by the apparatus to which the robot is dedicated. In practice it is necessary to reprogram the robot even for the processing of products that are slightly dissimilar. The use of a low-level language in such situations makes it difficult to reuse sequences of instructions that have already been coded. Finally, the practice of these known kinds of method of the current art has demonstrated that acquisition of data from predefined information-technology media, in which the product being processed has been designed by using dedicated graphic tools, for example a CAD (Computer Aided Design) environment, is still very difficult. This is clearly a considerable limitation in terms of flexibility of the robot operation.

SUMMARY OF THE INVENTION

Therefore, the aim of the present invention is to provide a method for the off-line programming of the movement of an industrial robot, which allows the user to work by using sequences of instructions characterized by a relatively high degree of abstraction.

Within the scope of this aim, an object of the present invention is to provide a method, which allows adopting standard application modules, which are easy to use, for programming.

Another object of the present invention is to provide a method, which allows an easy and simple acquisition of data from predefined information technology media, particularly from information technology-based design environments of the CAD type.

Another object of the present invention is to provide a method, which allows an easy reuse of sequences of instructions and/or data that have already been coded and/or used.

Another object of the present invention is to provide a method, which allows even not highly specialized personnel to perform off-line programming of the robot.

Another object of the present invention is to provide a method for the off-line programming of the movement of an industrial robot, which is easy to implement and at competitive costs.

Thus, the present invention provides a method for performing the off-line programming of the movement of an industrial robot, said industrial robot being dedicated to an industrial apparatus for processing products and comprising at least one actuation and control unit, characterized in that it comprises the phases that consist in:
 a) acquiring, in a computerized medium, first data which are indicative of the configuration of a manufacturing cell in which said industrial robot has to operate;
 b) acquiring, in said computerized medium, second data which are indicative of the geometry of a product being processed by said industrial apparatus;
 c) acquiring, in said computerized medium, third data which are indicative of a sequence of steps performed by said industrial apparatus for processing said product;
 d) acquiring, in said computerized medium, fourth data which are indicative of the geometry of tools used by said industrial apparatus during the processing of said product;
 e) automatically generating, in said computerized medium, on the basis of the data acquired in said steps a) and/or b) and/or c) and/or d), one or more first sequences of high-level instructions and one or more second sequences of low-level instructions, said first and second instruction sequences being suitable to manage one or more application modules stored beforehand on board said actuation and control unit; and
 f) automatically executing, in said actuation and control unit, said first and second instruction sequences.

BRIEF DESCRIPTION OF THE DRAWINGS

Further characteristics and advantages of the invention will become apparent from the description of a preferred but not exclusive embodiment of the method according to the present invention, illustrated only by way of non-limitative example in the accompanying drawings, wherein:

FIG. 1 is a schematic view of the structure of a manufacturing cell of an industrial robot, dedicated to an industrial apparatus, particularly for pressure folding;

FIG. 2 is a block diagram, which schematically illustrates the sequence of steps implemented by the method according to the invention.

DESCRIPTION OF THE PREFERRED EMBODIMENTS

With reference to FIG. 1, a typical configuration of a manufacturing cell for a robot dedicated to a pressure folding apparatus is described schematically.

The method according to the invention is described hereinafter, for the sake of simplicity and without intending to limit its aim and objects and inventive scope in any way, with particular reference to this type of industrial apparatus.

The manufacturing cell 100 consists of an area (dashed line in FIG. 1) which comprises an industrial robot 1 which is connected to an actuation and control unit 6 and is provided with mechanical elements (not shown in the figure) for performing all the necessary maneuvers. For example, the robot 1 can be of the anthropomorphic type and its movement can occur with six degrees of freedom.

Other elements that constitute the manufacturing cell can furthermore be the pressure folding apparatus 2, a pick-up station 3, an overturning station 4 and an unloading station 5. Additional elements which are important in the management of the movement of an industrial robot are the machining tools (not shown in the figure) used by the industrial apparatus to which the robot is dedicated.

With reference now to FIG. 2, the method according to the invention entails, in the phase a), the acquisition, in a computerized medium 10, of first data 11, which are indicative of the configuration of the manufacturing cell 100. In practice, the first data 11 may comprise data related to the relative position, with respect to the robot position 1, of the various elements that constitute the manufacturing cell. For example, the first data 11 may comprise information related to the elements 2, 3, 4 and 5 of FIG. 1. The computerized medium 10 can be implemented by one of the common available commercial computerized systems, appropriately configured by using one of the widespread operating systems. In a preferred embodiment, in order to ensure simple and effective implementation of the method according to the present invention said computerized medium can use an operating system such as Windows NT®.

In any case, the computerized medium 10 can be interfaced with the actuation and control unit 6 of FIG. 1. This can be achieved by using dedicated software, the development of which is relatively easy to perform. In a preferred embodiment of the method according to the invention, the phase a) can comprise the step a.1) of automatically acquiring a first portion 12 of the first data 11 from one or more predefined computerized media (not shown in FIG. 2). Further, the phase a) can comprise the step a.2) of integrating the data acquired in the step a.1) with a second portion 13 of the first data 11 acquired by measurements in the manufacturing cell 100, performed automatically by the industrial robot. The second portion 13 of the data first 11, in other words, is acquired by using, as a preliminary step, the robot as a probe, ascertaining the true relative position of the elements of the manufacturing cell. This can be achieved by providing the robot with appropriately positioned sensors.

The second data portion 13 is stored in the actuation and control unit 6 of the robot 1 and then acquired by the computerized medium 10. The step a.2) is particularly advantageous because, in this manner, the configuration of the virtual cell, available by virtue of the first portion 12 of the first data 11, is aligned with the configuration of the real cell, as measured by the robot 1.

The phase a) can also comprise the step a.3) of integrating, if necessary, the data acquired in the steps a.1) and/or a.2) with a third portion 14 of the first data 11, acquired by manual measurements in the manufacturing cell 100.

Therefore, the phase a) can comprise the step a.4) of integrating, if necessary, the data acquired in steps a.1) and/or a.2) and/or a.3) with a fourth portion 15 of the first data 11, acquired by manual editing on the portion of the user.

The steps a.2) . . . a.4) ensure the integration of the portion 12 of the first data 11 acquired automatically by means of one or more of the methods known in the state of the art. In another particularly advantageous embodiment, the first data 11 can be verified (step a.5), using one or more processes for simulating the movement of the industrial robot. In practice, procedures for simulating the behavior of the robot are executed in the same computerized medium 10 or in other media compatible with it. Advantageously, these simulation procedures can comprise processes for calculating the cycle times and the probability of collision of the industrial robot against the obstacles that may delimit its free movement space.

In the phase b), the method, according to the invention, entails acquiring second data 20 in the computerized medium 10. The second data 20 are preferably indicative of the geometry of the product, which should be processed. In practice, it is possible to acquire data, which provide indications related to the structure, geometry, dimensions et cetera of the product being processed.

In a preferred embodiment, the phase b) comprises the step b.1) of automatically acquiring a first portion 21 of the second data 20 from one or more predefined information-technology media. The acquisition from commercially available CAD environments is particularly advantageous. In particular, the acquisition from CAD environments, which implement graphical representations in two or three dimensions, is possible.

The phase b) can comprise also the step b.2) of integrating, if necessary, the data acquired in step b.1) with a second portion 22 of the second data 20, which is acquired with the aid of predefined graphic tools and/or manual editing. In particular, this can be achieved with great simplicity by configuring a dedicated CAD environment in the computerized medium 10.

In the phase c), the method according to the invention acquires, in the computerized medium 10, third data 30, which are indicative of the sequence of steps performed, for the processing of the desired product, by the industrial apparatus, to which the robot is dedicated. For example, if the industrial robot is dedicated to a pressure folding apparatus, the third data 30 can comprise data, which are indicative of the geometry of the outer surface of the product, before the folding process. Moreover, the third data 30 can comprise data, which are indicative of the position and extent of the bends to be performed in order to obtain the finished product. The third data 30 are acquired according to manners, which can be substantially similar to the second data 20. Therefore, the phase c) can provide, in a preferred embodiment, for the following steps:

c.1) automatically acquiring a first portion 31 of the third data 30 from one or more predefined information-technology media;

c.2) integrating, if necessary, the data acquired in step c.1) with a second portion 32 of the third data 30, acquired with the aid of predefined graphic tools and/or by manual editing.

At the phase d), the method according to the invention acquires, in the computerized medium 10, fourth data 40, which are indicative of the geometry and positioning of the tools used by the industrial apparatus to which the robot 1 is dedicated.

The acquisition of the fourth data 40 also can occur in manners, which can be substantially similar to the acquisition of the data 20 and/or 30. Therefore, the phase d) preferably provides for the following steps:

d.1) automatically acquiring a first portion 41 of the fourth data 40 from one or more predefined information-technology media;

d.2) integrating, if necessary, the data acquired in step d.1) with a second portion 42 of the fourth data 40, acquired with the aid of predefined graphic tools and/or by manual editing.

As an alternative, the data 20 and/or the data 30 and/or the data 40 can be acquired entirely by using the predefined graphic tools, included in the computerized medium 10, that have been mentioned referring to the step b.2) of the phase b).

After the data acquisition phases a) . . . d), the method, according to the invention, comprises the phase e). The phase e) provides for the automatic generation, on the basis of the data 11 and/or 20 and/or 30 and/or 40, of one or more first sequences of high-level instructions 50 and of one or more sequences of low-level instructions 53. The first and second sequences 50 and 53 are suitable to manage one or more application modules 51 that have been stored beforehand on board of the actuation and control unit 6. The application modules 51 preferably comprise one or more predefined executable procedures, written for example in RAPID® language, which are suitable to control predefined sequences of movements of the robot 1.

In a particularly advantageous alternative embodiment, the phase e) comprises the step e.1) of determining, on the basis of the data 11 and/or 20 and/or 30 and/or 40, values 90. The values 90 are preferably indicative of the optimum configuration of the manufacturing cell, for various types of processed product. This can be achieved by appropriately using a simulation engine, which is suitable to reproduce predefined heuristic rules. The phase e) can also comprise a further step e.2). The step e.2) provides for automatically generating, on the basis of the data 11 and/or 20 and/or 30 and/or 40 and/or the values 90, one or more first sequences of high-level instructions 50 and one or more sequences of low-level instructions 53. As described earlier, the first and second sequences 50 and 53 are suitable to manage one or more application modules 51 which are stored beforehand on board of the actuation and control unit 6.

This alternative embodiment of the method according to the invention is particularly advantageous, since it allows to use the computerized medium 10 as a design tool and/or database, capable of providing indications as to the optimum configuration of the manufacturing cell.

The method according to the invention then entails, in the phase f), the automatic execution, in the actuation and control unit 6, of the first and second instruction sequences 50 and 53. The instruction sequences 50 and 53 can be sent and stored on board the actuation and control unit automatically or by virtue of other known methods. The execution of the instruction sequences 50 retrieves and uses the predefined executable procedures included in the application modules 51. Coordination and combination of the execution of these predefined executable procedures according to the intended criteria is instead ensured by the execution of the second low-level instructions sequences 53.

In practice, for the processing of a given product, on the basis of the data acquired in the phases a) and/or b) and/or c) and/or d), instruction sequences (high-and low-level ones) are executed automatically in phase f). The phase f) uses, according to specific criteria, the predefined executable procedures included in the application modules 51.

In order to process another product, other high-level instruction sequences are generated, which use the same procedures according to different criteria or combinations. This fact is particularly advantageous, since it allows to achieve high standardization in the programming of the movement of the robot 1. This considerably limits the possibility of introducing errors in the programming, since the user does not have direct access to the application modules 51 but only to the high-level instructions. Once the procedures included therein have been perfected, the application modules 51, stored on board the actuation and control unit, ensure reliable and repeatable execution of instructions for moving the robot.

In another embodiment, the method according to the invention can comprise also a phase f.1). The phase f.1) consists in automatically generating, by executing one or more sequences of the high-level instructions 50, in the actuation and control unit 6, one or more third low-level instruction sequences 54 which are suitable to control the movement of the industrial robot. In this case, the execution of the high-level instructions 50 does not merely consist in retrieving a predefined executable procedure but also consists in compiling one or more predefined compilable procedures comprised in the application modules 51. The compiling of one or more these compilable procedures generates the instruction sequences 54. In practice, this phase can automatically generate at least portion of the so-called "portion program" in low-level language used by the actuation and control unit 6 to control the movement of the robot 1.

In practice it has been found that the method according to the invention fully achieves the intended aim and objects.

The use of high-level instructions for programming allows to fully solve the drawbacks that are typical of known methods of the current art, ensuring, by virtue of the use of predefined application modules, high levels of reliability and repeatability. The so-called "portability" of the performed programming is furthermore considerably increased: the code used does not depend on the individual industrial apparatus to which the robot is dedicated. In this manner, the operating flexibility of the industrial robot is considerably increased. In order to program the movement of the robot for processing different products it is sufficient to acquire the necessary data without thereby having to rewrite the so-called portion program in a low-level language.

The method according to the invention furthermore provides for acquisition from information-technology CAD design environments. This fact allows to further reduce the time and cost entailed by data acquisition, at the same time reducing the likelihood of error. Furthermore, by virtue of the possibility to use CAD environments and simulation on board the computerized medium, the method according to the invention also allows to perform true local design activity, thus increasing the flexibility of programming activity.

The method according to the invention has been found easy to implement in a data processing system, which comprises a computerized medium 10 communicating with the actuation and control unit 6. This data processing system can be implemented on commercially known information-technology media, which are easily usable even by personnel without a specific training.

The method thus conceived is susceptible of numerous modifications and variations, all of which are within the scope of the inventive concept.

All the details may furthermore be replaced with other technically equivalent elements.

What is claimed is:

1. A method for performing the off-line programming of the movement of an industrial robot, said industrial robot being dedicated to an industrial apparatus for processing products and comprising at least one actuation and control unit, the said method comprising the following phases:

a) acquiring, in a computerized medium, first data which are indicative of the configuration of the manufacturing cell, in which said industrial robot has to operate;

b) acquiring, in said computerized medium, second data which are indicative of the geometry of a product being processed by said industrial apparatus;

c) acquiring, in said computerized medium, third data which are indicative of a sequence of steps performed by said industrial apparatus for processing said product;

d) acquiring, in said computerized medium, fourth data which are indicative of the geometry and positioning of tools used by said industrial apparatus during the processing of said product;

further comprising the phases that consist in:

e) automatically generating, in said computerized medium, on the basis of the data acquired in said steps a) and/or b) and/or c) and/or d), one or more first sequences of high-level instructions and one or more second sequences of low-level instructions, said first and second instruction sequences being suitable to manage one or more application modules stored beforehand on board said actuation and control unit; and f) automatically performing, in said actuation and control unit, said first and second instruction sequences.

2. The method according to claim 1, wherein said phase e) comprises the following steps:

e.1) determining, in said computerized medium, on the basis of the data acquired in said steps a) and/or b) and/or c) and/or d), first values which are indicative of the optimum configuration of the manufacturing cell, for one or more types of processed product;

e.2) automatically generating, in said computerized medium, on the basis of the data acquired in said steps a) and/or b) and /or c) and/or d) and/or of said first values, said first and second sequences of instructions.

3. The method according to claim 1, further comprising the following phase:

f.1) automatically generating, by executing one or more of said first sequences of instructions, one or more third low-level instruction sequences which are suitable to control the movement of said industrial robot.

4. The method according to claim 3, wherein said one or more application modules comprise one or more predefined compilable procedures, which are suitable to generate said one or more third low-level instructions, suitable to control the movement of said robot.

5. The method according to claim 1, wherein said phase a) comprises the following steps:

a.1) automatically acquiring a first portion of said first data from one or more predefined computerized media;

a.2) integrating, if necessary, the data acquired in step a.1) with a second portion of said first data acquired by measurements in said manufacturing cell, performed automatically by said industrial robot;

a.3) integrating, if necessary, the data acquired in steps a.1) and/or a.2) with a third portion of said first data, acquired by manual measurements in said manufacturing cell;

a.4) integrating, if necessary, the data acquired in steps a.1) and/or a.2) and/or a.3) with a fourth portion of said first data, acquired by manual editing on the portion of the user.

6. The method according to claim 5, wherein said phase step a) comprises the following step:

a.5) verifying the data acquired in steps a.1) and/or a.2) and/or a.3) and/or a.4) by executing one or more procedures for simulating the movement of said industrial robot in said manufacturing cell.

7. The method according to claim 6, wherein said one or more simulation procedures comprise processes for calculating cycle times and the probability of collision of said industrial robot.

8. The method according to claim 1, wherein said phase b) comprises one or more of the following steps:

b.1) automatically acquiring a first portion of said second data from said one or more predefined information-technology media;

b.2) integrating, if necessary, the data acquired in step b.1) with a second portion of said second data, which is acquired with the aid of predefined graphic tools and/or by manual editing.

9. The method according to claim 1, wherein said phase c) comprises one or more of the following steps:

c.1) automatically acquiring a first portion of said third data from one or more predefined information-technology media;

c.2) integrating, if necessary, the data acquired in step c.1) with a second portion of said third data, acquired with the aid of predefined graphic tools and/or by manual editing.

10. The method according to claim 1, wherein said second, third and fourth data are acquired by using predefined graphic tools included in said computerized medium.

11. The method according to claim 1, wherein said phase step d) comprises one or more of the following steps:

d.1) automatically acquiring a first portion of said fourth data from one or more predefined information-technology media;

d.2) integrating, if necessary, the data acquired in step d.1) with a second portion of said fourth data, acquired with the aid of predefined graphic tools and/or by manual editing.

12. The method according to claim 1, wherein said one or more application modules comprise one or more predefined executable procedures, which are suitable to control predefined sequences of movements of said industrial robot.

13. The method according to claim 1, wherein said industrial robot is dedicated to pressure folding units for machining metallic items.

14. The method according to claim 1, wherein said industrial robot is of the anthropomorphic type.

15. A data processing system for performing off-line programming of the movement of an industrial robot, comprising a computerized medium communicating to an actuation and control unit of said industrial robot, wherein it implements the method according to claim 1.

* * * * *